United States Patent [19]

Horton et al.

[11] Patent Number: 4,821,312

[45] Date of Patent: Apr. 11, 1989

[54] VOICE/DATA SWITCH

[75] Inventors: Stephen W. Horton, Kirkland; Dan M. Percival, Maple Valley, both of Wash.

[73] Assignee: Rainier Technologies Corporation, Redmond, Wash.

[21] Appl. No.: 109,260

[22] Filed: Oct. 14, 1987

[51] Int. Cl.$^4$ ............................................. H04M 11/00
[52] U.S. Cl. ..................................... 379/102; 379/104; 379/93; 379/97
[58] Field of Search ........................ 379/93, 95, 96, 97, 379/98, 100, 102, 104, 105

[56] References Cited

U.S. PATENT DOCUMENTS

| | | | |
|---|---|---|---|
| 4,266,098 | 5/1981 | Novak | 379/199 |
| 4,584,434 | 4/1986 | Hashimoto | 379/100 |
| 4,660,218 | 4/1987 | Hashimoto | 379/93 |

FOREIGN PATENT DOCUMENTS 0259058 12/1985 Japan ...................................... 379/100

Primary Examiner—Jin F. Ng
Assistant Examiner—Wing Fu Chan
Attorney, Agent, or Firm—Christensen, O'Connor, Johnson & Kindness

[57] ABSTRACT

A voice/data switch (13) for selectively connecting an audio communication terminal device (15), such as a telephone, or a piece of electronic data communication equipment (17), such as a telephone facsimile device or a computer, to a Telco line (19) is disclosed. The voice/data switch (13) includes an announcement device and return signal detector (21) that is enabled to send a message to a calling station upon receipt of a ring signal. The message requests a return signal, which may be generated by the depression of a key of a DTMF key pad, for example, if connection to the audio communication terminal device is desired. If the requested return signal is not received, the Telco line (19) is connected by the voice/data switch (13) to the piece of electronic data communication equipment (17). If the requested return signal is received, the Telco line (19) is connected by the voice/data switch (13) to the audio communication terminal device (15).

24 Claims, 3 Drawing Sheets

VOICE/DATA SWITCH

TECHNICAL AREA

This invention relates to telephone communication systems and, more particularly, voice/data switches for selectively connecting audio communication terminal devices, such as telephones, and pieces of electronic data communication equipment, such as telephone facsimile devices and computers, to a Telco central office line.

BACKGROUND OF THE INVENTION

In recent years, the connection of electronic data communication equipment, such as telephone facsimile devices (commonly called FAX machines) and computers, to telephone lines for data communication between such equipment has become more and more widespread as the price of the equipment has dropped. When data communication between electronic data communication equipment is desired, the equipment that is to receive data is "called" by the equipment that is to send the data. The calling is usually accomplished by an operator located at the calling station manually dialing the telephone number of the receiving station. Alternatively, more expensive electronic data communication equipment have the capability of dialing the number of the receiving station. This capability allows more expensive electronic data communication equipment to initiate data communication during periods of time when telephone system traffic is low and, as a result, line charges are low. Obviously, expensive equipment is not suitable for widespread use, particularly by untrained or relatively unsophisticated users. As a result, manual equipment is more widely used.

In order to maximize their usefulness, certain types of electronic data communication equipment, such as FAX machines, must be available to receive data at substantially any time. In order to meet this requirement, such data communication equipment is often connected to a dedicated Telco central office line, i.e., a line whose sole purpose is to convey data to and from the piece of electronic data communication equipment. The cost of a dedicated telephone line is easily justified when the line is used frequently by a piece of electronic data communication equipment. Conversely, when the telephone line is seldomly used by the piece of electronic data communication equipment, the cost of a dedicated telephone line is not easily justified. In order to avoid the expense of a dedicated line and allow a nondedicated Telco central office line to be selectively used for audio communication as well as data communication, voice/data switches have been developed. One such switch is described in U.S. Pat. No. 4,584,434 entitled "Automatic System for Automatic Information Reception Terminal Device Utilizing Telephone Circuit" by Kazuo Hashimoto. Unfortunately, voice/data switches of the type described in this patent have a serious disadvantage. Specifically, they require that a code be sent by the calling station before the piece of electronic data communication equipment that is to receive data is connected by the voice/data switch to the Telco central office line. More specifically, the switch described in U.S. Pat. No. 4,584,434 sends a message to a calling telephone station upon receipt of a ringing signal. The message requests that the calling telephone station send a particular DTMF code if the calling station desires to be connected to an associated piece of electronic data communication equipment, such as a FAX machine. If the requested code is not received, the FAX machine is not connected to the Telco line by the switch. Since there are no industry standard codes for communicating in this manner, in order for this system to be usable either an operator must initiate communication by manually calling the receiving station and responding to the message by sending the appropriate code, or the sending piece of electronic equipment must know the particular code required by the receiving station in advance and send it after the announcement has occurred. Both approaches are undesirable because they increase data communication complexity.

This invention is directed to overcoming the foregoing disadvantage by providing a voice/data switch that requires no operator or other intervention when a calling station wants to communicate with a piece of electronic data communication equipment located at a called station.

SUMMARY OF THE INVENTION

In accordance with this invention, a voice/data switch for selectively connecting an audio communication terminal device, such as a telephone, or a piece of electronic data communication equipment, such as a FAX machine or a computer, to a Telco line is disclosed. The voice/data switch includes an announcement device that is enabled to send a message to a calling station upon receipt of a ring signal. The message requests a signal, which may be generated by the depression of one or more keys of a DTMF key pad or dialing a digit from a rotary (pulse dialing) phone, for examples, if connection with the audio communication terminal device is desired. If the requested signal is not received, the Telco line is connected by the voice/data switch to the piece of electronic data communication equipment. If the requested signal is received, the Telco line is connected by the voice/data switch to the audio communication terminal device.

In accordance with other aspects of this invention, the voice/data switch includes a ring signal detector that detects the presence of a ring signal on the Telco line to which the voice/data switch is connected. When a ring signal is detected, an announcement device and return signal detector is connected to the Telco line. As a result, the return signal request message is sent to the calling station. After a predetermined period of time, if the requested return signal is not received, a ring signal generator is enabled and connected to the piece of electronic data communication equipment. Simultaneously, a busy signal generator connected to the audio communication terminal device is enabled. After the piece of electronic data communication equipment goes off-hook, the ring signal generator is disabled, the announcement device and return signal detector is disconnected and the piece of electronic data communication equipment is connected to the Telco line. If the calling station sends the return signal requested by the announcement device and return signal detector, the ring signal generator is enabled and connected to the audio communication terminal device. At the same time, a busy signal generator connected to the piece of electronic communication equipment is enabled. After the audio communication terminal device goes off-hook, the ring signal generator is disabled, the announcement device and return signal detector is disconnected and the audio communication terminal device is connected to the Telco line.

In accordance with further aspects of this invention, if either the piece of electronic data communication equipment or the audio communication terminal device goes off-hook when the other item is not communicating via the Telco line, the off-hook item is connected to the Telco line and the busy signal generator connected to the other item is enabled.

As will be readily appreciated by those skilled in the telephone communication art and others from the foregoing description, the invention provides a voice/data switch that overcomes the disadvantage of prior art voice/data switches of the type illustrated in U.S. Pat. No. 4,584,434 and described above. Specifically, a voice/data switch formed in accordance with the invention avoids the need to have either an operator or a sending piece of electronic data communication equipment transmit a code to a receiving station in order to be connected to a piece of electronic data communication equipment located at the receiving station. Hence, a voice/data switch formed in accordance with the invention reduces data communication costs. Data communication costs are reduced because one piece of electronic data communication equipment can be connected to another piece of electronic data communication equipment during periods of time when telephone system traffic is low, e.g., during the night, without either an operator or the calling equipment producing a connection signal in response to a message.

BRIEF DESCRIPTION OF THE DRAWINGS

The foregoing and other advantages of this invention will become more readily appreciated as the same becomes better understood by reference to the following detailed description of a preferred embodiment of the invention when taken in conjunction with the accompanying drawings wherein.

DESCRIPTION OF THE PREFERRED EMBODIMENT

Figure 1:
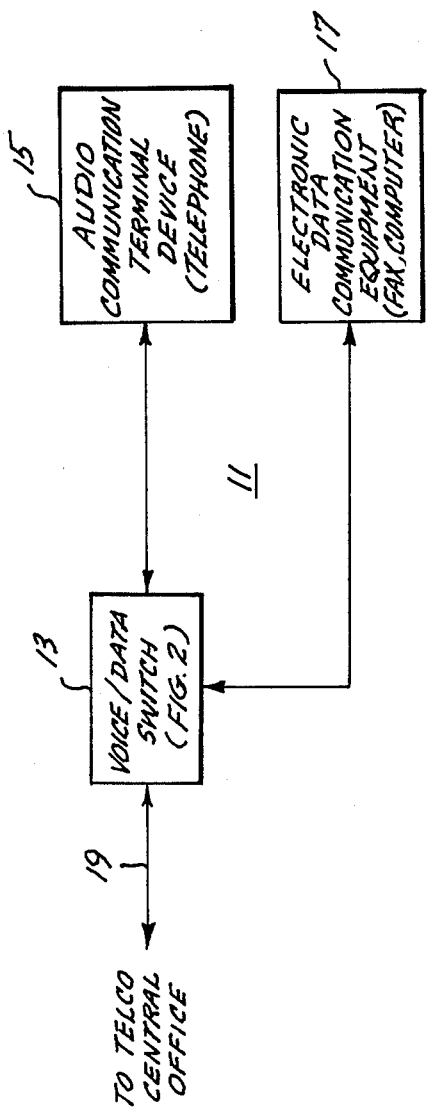
FIG. 1 is a block diagram of a telephone station including a voice/data switch formed in accordance with the invention.

FIG. 1 is a diagram of a Telco station 11 that includes a voice/data switch 13 formed in accordance with the invention. In addition to the voice/data switch 13, the Telco station includes an audio communication terminal device 15, such as a telephone, and a piece of electronic data communication equipment 17, such as a FAX machine or a computer. As will be better understood from the following description, the voice/data switch 13 selectively connects a Telco line 19 that runs to a Telco central office to either the audio communication terminal device 15 or the piece of electronic data communication equipment 17. As also will be better understood from the following description, the voice/data switch 13 interconnects the audio communication terminal device 15 and the piece of electronic data communication equipment 17 to the Telco line 19 such that, upon receipt of a ring signal, the piece of electronic data communication equipment 17 is connected to the Telco central office unless the voice/data switch 13 receives a requested return signal. If the requested return signal is received, the voice/data switch 13 connects the audio communication terminal device 15 to the Telco line 19. While, preferably, the requested return signal is a particular DTMF (dual tone multi-frequency) signal of the type produced when a particular key, e.g., a zero, of the key pad of a Touch-Tone telephone is depressed, other return signals can be used. For example, the requested return signal can be one or more pulses of the type produced by a rotary dial telephone, a specific tone produced by a tone generator or even the fluctuating signal caused by the human voice. Alternatively, either one of two signals can be used to form the return signal—a DTMF zero or a rotary dial zero, for example.

Figure 2:
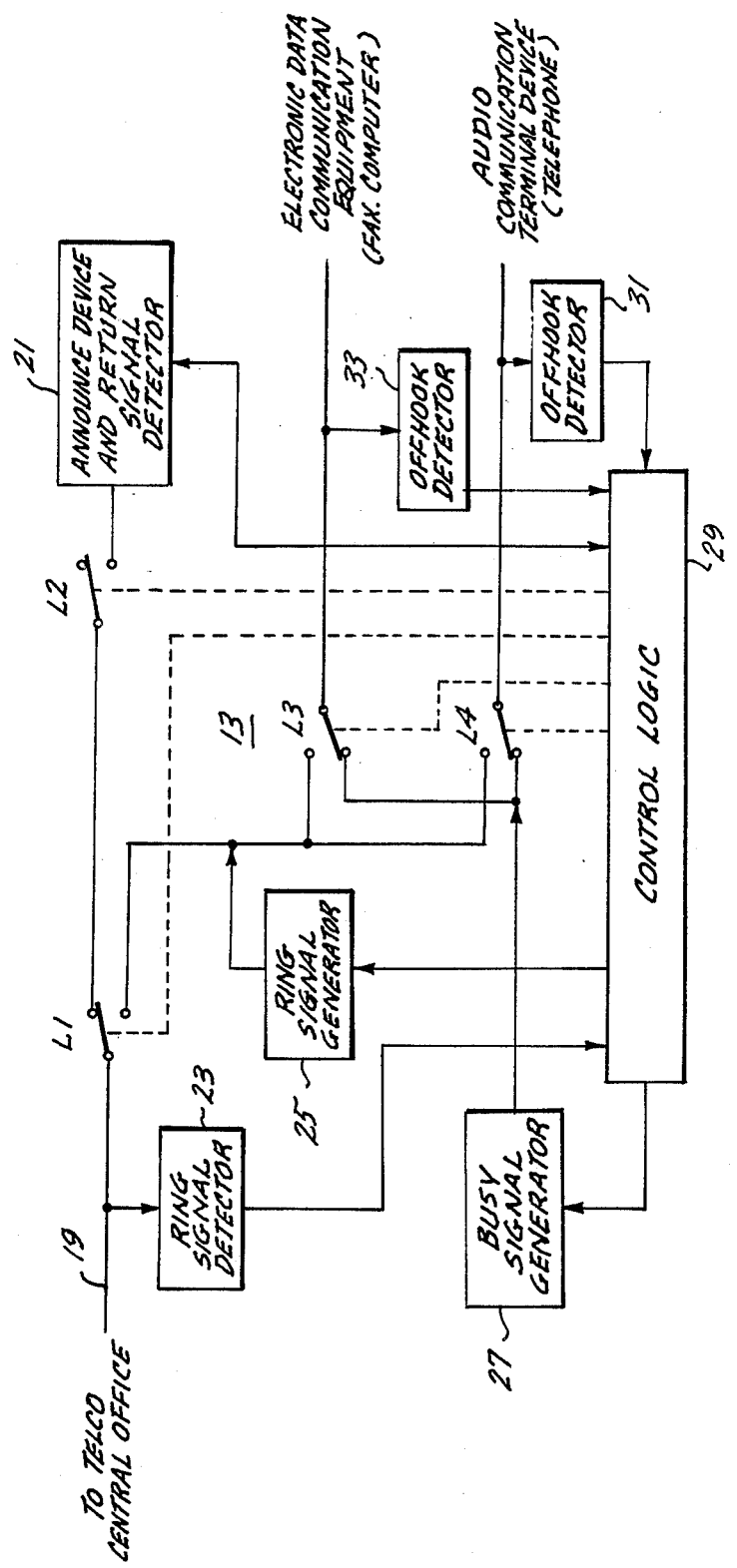
FIG. 2 is a block diagram of a voice/data switch formed in accordance with the invention and suitable for use in the system illustrated in FIG. 1; and, FIG. 3 is a flow diagram illustrating the operation of the control logic of the voice/data switch illustrated in FIG. 2.

FIG. 2 is a block diagram of a voice/data switch formed in accordance with the invention and suitable for use in the system illustrated in FIG. 1. The voice/data switch 13 illustrated in FIG. 2 includes: an announce device and return signal detector 21 (for both DTMF And pulse dialing); a ring signal detector 23; a ring signal generator 24; a busy signal generator 27; control logic 29; first and second off-hook detectors 31 and 33; and, four double pole single throw sets of switch contacts designated L1, L2, L3 and L4. The state of L1, L2, L3 and L4 is controlled by the control logic 29. L1, L2, L3 and L4 can be formed by the contacts of relays controlled by the control logic 29 in the manner hereinafter described. Alternatively, L1, L2, L3 and L4 can be formed by solid state switches controlled by the control logic 29.

The central office Telco line 19 is connected to the input of the ring signal detector 23 and to the common terminal of L1. One of the remote terminals of L1 is connected to the common terminal of L2. One of the remote terminals of L2 is unconnected and the other remote terminal is connected to the announce device and return signal detector 21. The announce device and return signal detector 21 is also connected to the control logic 29. The output of the ring signal detector 23 is also connected to control logic 29.

The control logic produces enable signals in the manner hereinafter described that are applied to enable inputs of the ring signal generator 25 and the busy signal generator 27. The output of the ring signal generator 25 is connected to one of the remote terminals of each of L3 and L4. The other remote terminal of L1 is also connected to the same remote terminals of L3 and L4. The output of the busy signal generator 27 is connected to the other remote terminal of L3 and L4. The common terminal of L3 is connected to the piece of electronic data communication equipment 17 and the common terminal of L4 is connected to the audio communication terminal device 15. The input of the first off-hook detector 31 is connected to the common terminal of L4 and the output of the first off-hook detector 31 is connected to the control logic 29. The input of the second off-hook detector 33 is connected to the common terminal of L3 and the output of the second off-hook detector 33 is connected to the control logic 29. Thus, the first off-hook detector 31 detects whether the audio communication terminal device 15 is on-hook or off-hook and the second off-hook detector 33 detects whether the piece of electronic data communication equipment 17 is on-hook or off-hook.

As illustrated by the dashed lines in FIG. 2, and as noted above, the state of L1, L2, L3 and L4 is controlled by the control logic 29. In the quiescent or idle state, i.e., when no signals are being sent or received via the Telco line 19, the closed terminal of L1 is connected to the common terminal of L2, the closed terminal of L2 is unconnected and the closed terminals of L3 and L4 are connected to the output of the busy signal generator 27.

Figure 3:
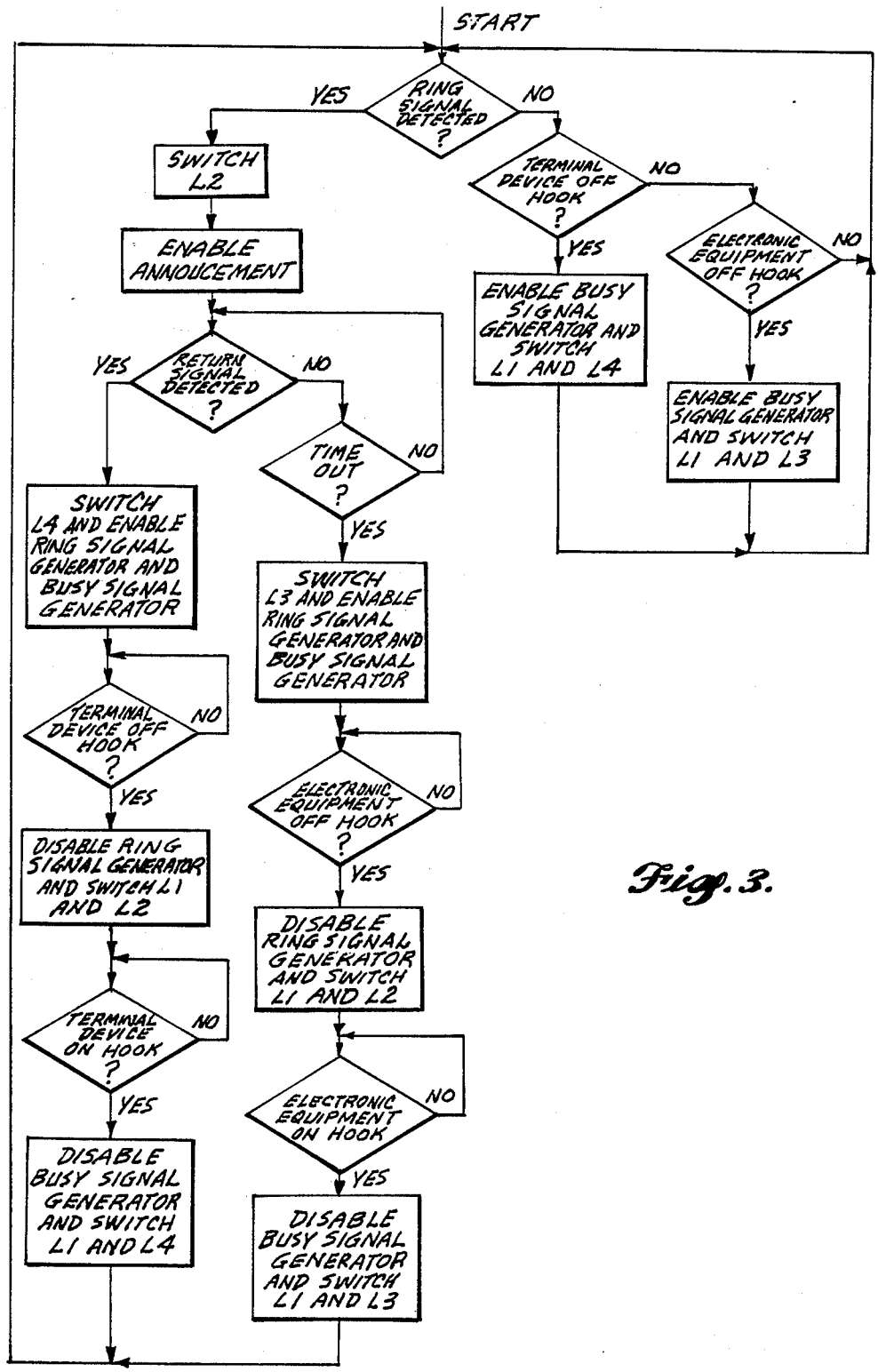

FIG. 3 is a flow diagram illustrating the manner in which the control logic 29 of the voice/data switch illustrated in FIG. 2 control the operation of L1 through L4 and the ring and busy signal generators 25 and 27. Initially, the control logic 29 tests the ring signal detector 23 to determine if a ring signal is being detected. If no ring signal is being detected, the control logic tests the first off-hook detector 31 to determine if the audio communication terminal device is off-hook. If the audio communication terminal device is not off-hook, the control logic 29 tests the second off-hook detector 33 to determine if the piece of electronic data communication equipment is off-hook. If the piece of electronic data communication equipment is not off-hook, the control logic again tests the ring detector 23 to determine if a ring signal has been detected.

When the ring detector 23 detects a ring signal, the control logic causes L2 to switch states. As a result, the announce device and return signal detector 21 is connected to the Telco line 19. Next the control logic enables the announce device and return signal detector 21 causing it to produce an audible message. The message may be stored in a tape recorder or, more preferably, in a solid state voice synthesizer. The message may, for example, say "If you would like to be connected to John Smith's telephone, dial zero."

After the announcement device and return signal detector has been enabled, the control logic 29 monitors the announce device and return signal detector to determine if the requested signal, i.e., a zero, is received. If no return signal is received, a test is made to determine if a time-out timer, started when the announcement was enabled, has timed out. If the time-out timer has not timed out, the control logic 29 again tests the announce device and return signal detector 21 to determine if a return signal has been detected. If no return signal is detected before the time-out period ends, the control logic 29 causes L3 to switch states and enables the ring and busy signal generators. As a result, the piece of electronic data communication equipment 17 is connected to the ring signal generator 25. The audio communication terminal device remains connected to the busy signal generator 27 via L4. Next, the control logic 29 tests the second off-hook detector 33 to determine if the piece of electronic data communication equipment is off-hook. The control logic continues this test until the piece of electronic data communication equipment goes off-hook in response to the ring signal generated by the ring signal generator 25. When this occurs, the control logic disables the ring signal generator 25 and causes L1 and L2 to switch states. As a result, the announce device and return signal detector 21 is disconnected from the Telco line 19 and the piece of electronic data communication equipment 17 is connected to the Telco line 19. Thereafter, the control logic 29 monitors the second off-hook detector 33. Monitoring continues until the piece of electronic data communication equipment 17 goes on-hook as a result of the termination of a signal from the calling station. When this occurs, the control logic disables the busy signal generator 27 and causes L1 and L3 to switch states. As a result, L1, L2, L3 and L4 of the voice/data switch are all in their quiescent or idle states. As noted, during the period of time that the electronic equipment is off-hook, the busy signal generator 27 is enabled to apply a busy signal to the audio communication terminal device in the event that the audio communication terminal device goes off-hook.

If a return signal is detected after the announce device and return signal detector has been enabled to transmit the prerecorded announcement, the control logic 29 causes L4 to switch states and enables the ring and busy signal generators. As a result, the audio communication terminal device 15 is connected to the ring signal generator 25. Thereafter, the control logic 29 monitors the first off-hook detector 31. When the audio communication terminal device 15 goes offhook, the control logic 29 disables the ring signal generator 25 and causes L1 and L2 to switch states. As a result, the announce device and return signal detector 21 is disconnected from the Telco central office line 19 and the audio communication terminal device is connected to the Telco line 19 via L4 and L1. Thereafter the control logic 29 monitors the first off-hook detector 31 to determine when the audio communication terminal device returns to its on-hook state. When this occurs, the control logic 29 disables the busy signal generator 27 and causes L1 and L4 to switch states. As a result, L1, L2, L3 and L4 are all in their idle or quiescent states, which are illustrated in FIG. 2 and described above. As noted, during the period of time that the audio communication terminal device is communicating to the Telco line 19 via L4 and L1, the busy signal generator 27 is enabled to apply a busy signal to the electronic equipment via L3.

As noted above, in the absence of a ring signal from another station, the control logic 29 continuously monitors the first and second off-hook detectors 31 and 33 to determine if either the audio communication terminal device 15 or the piece of electronic data communication equipment 17 is off-hook. If the audio communication terminal device goes off-hook, the control logic 29 enables the busy signal generator 27 and causes L1 and L4 to switch states. As a result, the audio communication terminal device is connected to the Telco line 19 via L1 and L4. Simultaneously, a busy signal is applied to the piece of electronic data communication equipment via L3. In a conventional manner, this signal prevents the piece of electronic data communication equipment from attempting to seize the Telco line 19.

If the piece of electronic data communication equipment goes off-hook, the control logic 29 also enables the busy signal generator 27. Further, the control logic causes L1 and L3 to switch states. In this case the piece of electronic data communication equipment is connected to the Telco line 19 via L1 and L3. Simultaneously, a busy signal is applied to the audio communication terminal device for detection in the event the audio communication terminal device is offhook.

As will be readily appreciated from the foregoing description, the invention provides a voice/data switch that overcomes the disadvantages of voice/data switches of the type illustrated in U.S. Pat. No. 4,584,434. Specifically, the invention provides a voice/data switch that automatically connects a piece of electronic data communication equipment to a Telco line if a requested return signal is not produced by a calling station. Because a Telco line can be used to receive data from a remote source automatically without an operator and/or equipment sending a requested return signal, the invention is ideally suited for use with electronic data communication equipment available to receive data during periods of time when telephone system traffic is low, such as late at night at minimal cost.

While a preferred embodiment of the invention has been illustrated and described, it will be appreciated that various changes can be made therein without departing from the spirit and scope of the invention. Consequently, within the scope of the appended claims, it is to be understood that the invention can be practiced otherwise than as specifically described herein.

The embodiments of the invention in which an exclusive property or privilege is claimed are defined as follows:

1. A voice/data switch for selectively connecting a Telco line to either a piece of electronic data communication equipment, such as a FAX machine or a computer, or an audio communication device, such as a telephone, said voice/data switch comprising:
   announcement and return signal means for producing an audible message requesting a return signal and detecting the receipt of said requested return signal; and,
   switch means connected to said announcement and return signal means for receiving a signal when said announcement and return signal means receives said return signal and selectively controlling the connection of either a piece of electronic data communication equipment or an audio communication terminal device to a Telco line such that said piece of electronic data communication equipment is connected to said Telco line if a return signal is not detected by said announcement and return signal means and said audio communication terminal device is connected to said Telco line if a return signal is detected by said announcement and return signal means.

2. A voice/data switch as claimed in claim 1, wherein said return signal is either a DTMF signal or a rotary dial signal.

3. A voice/data switch as claimed in claim 1, wherein:
   said switch means includes a busy signal generator; and,
   said switch means selectively controls the connection of said busy signal generator to said piece of electronic data communication equipment and said audio communication terminal device such that said busy signal generator is connected to said audio communication terminal if a return signal is not detected by said announcement and return signal means and said busy signal generator is connected to said electronic data communications equipment if a return signal is detected by said announcement and return signal means.

4. A voice/data switch as claimed in claim 3, wherein said return signal is either a DTMF signal or a rotary dial signal.

5. A voice/data switch as claimed in claim 1, wherein said switch means includes:
   a ring signal detector for detecting the presence of a ring signal on said Telco line;
   a first two-position switch, one of said switch positions connecting said announcement and return signal means to said Telco line; and,
   control means connected to said ring signal detector and said first switch for causing said first switch means to switch to said position connecting said announcement and return signal means to said Telco line when said ring signal detector detects a ring signal on said Telco line.

6. A voice/data switch as claimed in claim 5, wherein said return signal is either a DTMF signal or a rotary dial signal.

7. A voice/data switch as claimed in claim 5, wherein:
   (a) said switch means includes:
      (1) a ring signal generator;
      (2) a busy signal generator;
      (3) a second two-position switch connected to said ring signal generator and said busy signal generator for selectively connecting either said ring signal generator or said busy signal generator to said piece of electronic data communication equipment; and,
      (4) a third two-position switch connected to said ring signal generator and said busy signal generator for selectively connecting either said ring signal generator or said busy signal generator to said audio communication terminal device; and,
   (b) said control means is connected to said second and third switches for controlling said second and third switches such that:
      (1) said second switch connects said ring signal generator to said piece of electronic data communication equipment and said third switch connects said busy signal generator to said audio communication terminal device when said announcement and return signal means does not detect said return signal; and,
      (2) said third switch connects said ring signal generator to said audio communication terminal device and said second switch connects said busy signal generator to said piece of electronic data communication equipment when said announcement and return signal means detects said return signal.

8. A voice/data switch as claimed in claim 7, wherein said return signal is either a DTMF signal or a rotary dial signal.

9. A voice/data switch as claimed in claim 7, wherein:
   (a) said switch means includes:
      (1) off-hook detector means for detecting whether said piece of electronic data communication equipment and said audio communication terminal device are on-hook or off-hook; and,
      (2) a fourth two-position switch, one of said positions connecting said Telco line to said first switch and said second position connecting said Telco line to said second and third switches; and,
   (b) said control means is connected to said off-hook detector means and said fourth switch for controlling said fourth switch such that said Telco line is connected to said first switch when said piece of electronic data communication equipment and said audio communication device are both on-hook and said Telco line is connected to said second and third switches when either said piece of electronic data communication equipment or said audio communication terminal device is off-hook.

10. A voice/data switch as claimed in claim 9, wherein said return signal is either a DTMF signal or a rotary dial signal.

11. A telephone station comprising:
   (a) a piece of electronic data communication equipment;

(b) an audio communication terminal device; and,
(c) a voice/data switch, said voice/data switch comprising:
  (1) announcement and return signal means for producing an audible message requesting a return signal and detecting the receipt of said requested return signal; and,
  (2) switch means connected to said announcement and return signal means for receiving a signal when said announcement and return signal means receives said return signal and selectively controlling the connection of either said piece of electronic data communication equipment or said audio communication terminal device to a Telco line such that said piece of electronic data communication equipment is connected to said Telco line if a return signal is not detected by said announcement and return signal means and said audio communication terminal device is connected to said Telco line if a return signal is detected by said announcement and return signal means.

12. A telephone station switch as claimed in claim 11, wherein said return signal is either a DTMF signal or a rotary dial signal.

13. A telephone station switch as claimed in claim 11, wherein:
  said switch means includes a busy signal generator; and,
  said switch means selectively controls the connection of said busy signal generator to said piece of electronic data communication equipment and said audio communication terminal device such that said busy signal generator is connected to said audio communication terminal if a return signal is not detected by said announcement and return signal means and said busy signal generator is connected to said electronic data communications equipment if a return signal is detected by said announcement and return signal means.

14. A telephone station switch as claimed in claim 13, wherein said return signal is either a DTMF signal or a rotary dial signal.

15. A telephone station as claimed in claim 11, wherein said switch means includes:
  a ring signal detector for detecting the presence of a ring signal on said Telco line;
  a first two-position switch, one of said switch positions connecting said announcement and return signal means to said Telco line; and,
  control means connected to said ring signal detector and said first switch for causing said first switch means to switch to said position connecting said announcement and return signal means to said Telco line when said ring signal detector detects a ring signal on said Telco line.

16. A telephone station switch as claimed in claim 15, wherein said return signal is either a DTMF signal or a rotary dial signal.

17. A telephone station as claimed in claim 15, wherein:
  (a) said switch means includes:
    (1) a ring signal generator;
    (2) a busy signal generator;
    (3) a second two-position switch connected to said ring signal generator and said busy signal generator for selectively connecting either said ring signal generator or said busy signal generator to said piece of electronic data communication equipment; and,
    (4) a third two-position switch connected to said ring signal generator and said busy signal generator for selectively connecting either said ring signal generator or said busy signal generator to said audio communication terminal device; and,
  (b) said control means is connected to said second and third switches for controlling said second and third switches such that:
    (1) said second switch connects said ring signal generator to said piece of electronic data communication equipment and said third switch connects said busy signal generator to said audio communication terminal device when said announcement and return signal means does not detect said return signal; and,
    (2) said third switch connects said ring signal generator to said audio communication terminal device and said second switch connects said busy signal generator to said piece of electronic data communication equipment when said announcement and return signal means detects said return signal.

18. A telephone station switch as claimed in claim 17, wherein said return signal is either a DTMF signal or a rotary dial signal.

19. A voice/data switch as claimed in claim 17, wherein:
  (a) said switch means includes:
    (1) off-hook detector means for detecting whether said piece of electronic data communication equipment and said audio communication terminal device are on-hook or off-hook; and,
    (2) a fourth two-position switch, one of said positions connecting said Telco line to said first switch and said second position connecting said Telco line to said second and third switches; and,
  (b) said control means is connected to said off-hook detector means and said fourth switch for controlling said fourth switch such that said Telco line is connected to said first switch when said piece of electronic data communication equipment and said audio communication device are both on-hook and said Telco line is connected to said second and third switches when either said piece of electronic data communication equipment or said audio communication terminal device is off-hook.

20. A telephone station switch as claimed in claim 19, wherein said return signal is either a DTMF signal or a rotary dial signal.

21. In a voice/data switch for selectively connecting a Telco line to either a piece of electronic data communication equipment, such as a FAX machine or a computer, or an audio communication terminal device, such as a telephone, in response to the presence or absence of a predetermined return signal on said Telco line produced in response to a request for said return signal by an announcement device forming part of said voice/data switch, the improvement comprising control means for controlling said voice/data switch such that said Telco line is connected to said piece of electronic data communication equipment in the absence of said return signal and said Telco line is connected to said audio communication terminal device when said return signal occurs.

22. The improvement claimed in claim 21, wherein said return signal is either a DTMF signal or a rotary dial signal.

23. The improvement claimed in claim 21, wherein:
said control means includes a busy signal generator; and,
said control means connects said busy signal generator to said audio communication device in the absence of a return signal and connects said busy signal generator to said electronic data communication equipment when said return signal occurs.

24. The improvement claimed in claim 23, wherein said return signal is either a DTMF signal or a rotary dial signal.

* * * * *

UNITED STATES PATENT AND TRADEMARK OFFICE
CERTIFICATE OF CORRECTION

PATENT NO. : 4,821,312

DATED : April 11, 1989

INVENTOR(S) : S. W. Horton et al.

It is certified that error appears in the above-identified patent and that said Letters Patent is hereby corrected as shown below:

Column 4, line 22: "24" should be --25--

Signed and Sealed this

Seventh Day of May, 1991

Attest:

HARRY F. MANBECK, JR.

Attesting Officer

Commissioner of Patents and Trademarks

REEXAMINATION CERTIFICATE (1495th)
United States Patent [19]
Horton et al.

[11] B1 4,821,312
[45] Certificate Issued Jun. 25, 1991

[54] VOICE/DATA SWITCH

[75] Inventors: Stephen W. Horton, Kirkland; Dan M. Percival, Maple Valley, both of Wash.

[73] Assignee: Rainier Technologies Corporation, Kirkland, Wash.

Reexamination Request:
No. 90/002,011, Apr. 30, 1990

Reexamination Certificate for:
Patent No.: 4,821,312
Issued: Apr. 11, 1989
Appl. No.: 109,260
Filed: Oct. 14, 1987

[51] Int. Cl.$^5$ .................................. H04M 11/00
[52] U.S. Cl. ........................... 379/102; 379/67; 379/80; 379/93; 379/97; 379/100; 379/104
[58] Field of Search ......................... 379/93, 95–98, 379/100, 102, 104, 105, 88

[56] References Cited

U.S. PATENT DOCUMENTS

| | | | |
|---|---|---|---|
| 4,266,098 | 5/1981 | Novak | 379/199 |
| 4,353,097 | 10/1982 | Takeda et al. | 379/100 |
| 4,584,434 | 4/1986 | Hashimoto | 379/100 |
| 4,660,218 | 4/1987 | Hashimoto | 379/93 |
| 4,794,637 | 12/1988 | Hashimoto | 379/100 |
| 4,800,439 | 1/1989 | Yoshino | 379/100 |

FOREIGN PATENT DOCUMENTS

| | | | |
|---|---|---|---|
| 0259058 | 12/1985 | Japan | 379/100 |
| 62-259058 | 11/1987 | Japan | |

*Primary Examiner*—Jin F. Ng

[57] ABSTRACT

A voice/data switch (13) for selectively connecting an audio communication terminal device (15), such as a telephone, or a piece of electronic data communication equipment (17), such as a telephone facsimile device or a computer, to a Telco line (19) is disclosed. The voice/data switch (13) includes an announcement device and return signal detector (21) that is enabled to send a message to a calling station upon receipt of a ring signal. The message requests a return signal, which may be generated by the depression of a key of a DTMF key pad, for example, if connection to the audio communication terminal device is desired. If the requested return signal is not received, the Telco line (19) is connected by the voice/data switch (13) to the piece of electronic data communication equipment (17). If the requested return signal is received, the Telco line (19) is connected by the voice/data switch (13) to the audio communication terminal device (15).

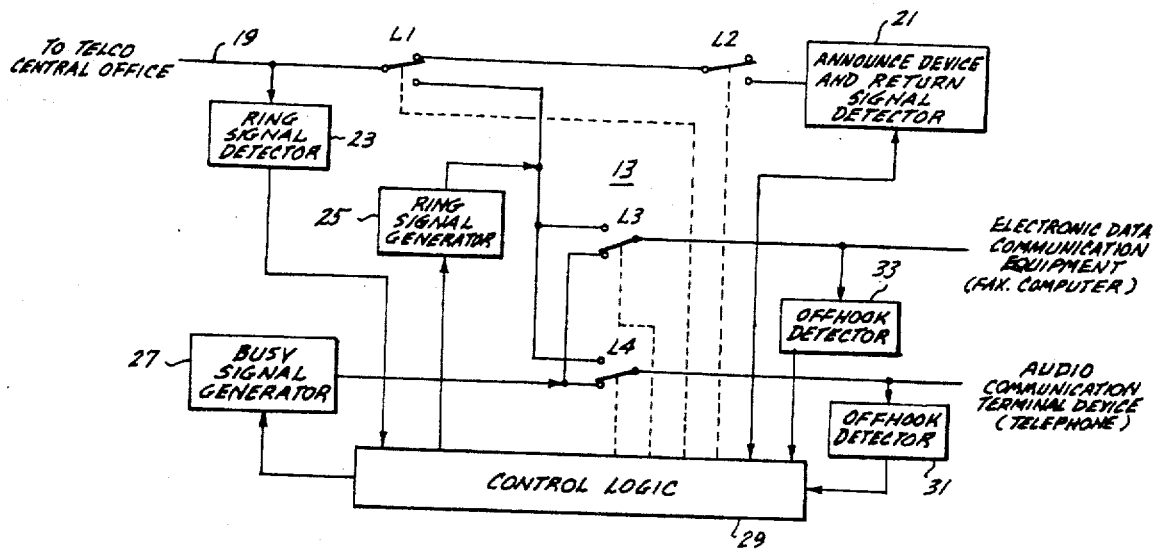

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11 and 21 are determined to be patentable as amended.

Claims 2-10, 11-20 and 22-24, dependent on an amended claim, are determined to be patentable.

1. A voice/data switch for selectively connecting a Telco line to either a piece of electronic data communication equipment, such as a FAX machine or a computer, or an audio communication device, such as a telephone, said voice/data switch comprising:
   announcement and return signal means for producing [an] *a human understandable* audible message requesting a return signal and detecting the receipt of said requested return signal; and,
   switch means connected to said announcement and return signal means for receiving a signal when said announcement and return signal means receives said return signal and [selectively controlling the connection of], *subsequent to the receipt of said return signal or after a time-out period has expired, connecting* either a piece of electronic data communication equipment or an audio communication terminal device to a Telco line such that said piece of electronic data communication equipment is connected to said Telco line [if a return signal is not] *after said time-out period has expired, provided said return signal has not been* detected by said announcement and return signal means, and said audio communication terminal device is connected to said Telco line if a return signal is detected by said announcement and return signal means.

11. A telephone station comprising:
   (a) a piece of electronic data communication equipment;
   (b) an audio communication terminal device; and,
   (c) a voice/data switch, said voice/data switch comprising:
      (1) announcement and return signal means for producing [an] *a human understandable* audible message requesting a return signal and detecting the receipt of said requested return signal; and
      (2) switch means connected to said announcement and return signal means for receiving a signal when said announcement and return signal means receives said return signal and [selectively controlling the connection of], *subsequent to the receipt of said return signal or after a time-out period has expired, connecting* either said piece of electronic data communication equipment or said audio communication terminal device to a Telco line such that said piece of electronic data communication equipment is connected to said Telco line [if a return signal is not] *after said time-out period has expired, provided said return signal has not been* detected by said announcement and return signal means, and said audio communication terminal device is connected to said Telco line if a return signal is detected by said announcement and return signal means.

21. In a voice/data switch for selectively connecting a Telco line to either a piece of electronic data communication equipment, such as a FAX machine or a computer, or an audio communication terminal device, such as a telephone, in response to the presence or absence of a predetermined return signal on said Telco line produced in response to a *human understandable* request for said return signal by an announcement device forming part of said voice/data switch, the improvement comprising control means for controlling said voice/data switch such that *after said human understandable request for a return signal is produced* said Telco line is connected to said piece of electronic data communication equipment in the absence of said return signal and said Telco line is connected to said audio communication terminal device when said return signal occurs.

* * * * *